(12) United States Patent
Zuidema et al.

(10) Patent No.: US 7,800,703 B2
(45) Date of Patent: Sep. 21, 2010

(54) DISPLAY DEVICE

(75) Inventors: Hans Zuidema, Eindhoven (NL); Harry Kuijpers, Haler (NL); Laurens Doornhein, Nuenen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 50 days.

(21) Appl. No.: 12/096,935

(22) PCT Filed: Dec. 12, 2006

(86) PCT No.: PCT/IB2006/054765
§ 371 (c)(1),
(2), (4) Date: Jun. 11, 2008

(87) PCT Pub. No.: WO2007/069195
PCT Pub. Date: Jun. 21, 2007

(65) Prior Publication Data
US 2008/0316379 A1 Dec. 25, 2008

(30) Foreign Application Priority Data
Dec. 13, 2005 (EP) .................................. 05112035

(51) Int. Cl.
*G02F 1/1335* (2006.01)
*H04N 13/04* (2006.01)
(52) U.S. Cl. ............................ 349/15; 348/59; 349/57
(58) Field of Classification Search .................. 349/15, 349/57; 348/59
See application file for complete search history.

(56) References Cited

U.S. PATENT DOCUMENTS 6,064,424 A    5/2000  Van Berkel et al.

2005/0057807 A1    3/2005  Takagi et al.
2005/0099689 A1    5/2005  Fukushima et al.

FOREIGN PATENT DOCUMENTS

| EP | 1447996 A2 | 8/2004 |
| EP | 1729164 A1 | 12/2006 |
| GB | 2196166 A | 4/1998 |
| JP | 07322305 A | 12/1995 |

(Continued)

OTHER PUBLICATIONS

Van Berkel et al: "Characterisation and Optimisation IF 3D-LCD Module Design"; Proceedings of the SPIE, vol. 3012, Feb. 11, 1997, pp. 179-186.

*Primary Examiner*—Jerry T Rahll
(74) *Attorney, Agent, or Firm*—Larry Liberchuk

(57) ABSTRACT

An autostereoscopic display device comprises a display panel having an array of display pixels for producing a display. The display pixels are arranged in orthogonal rows and columns. The device also comprises an array of parallel lenticular elements positioned over the display panel. The lenticular elements have optical focal axes that are slanted at an angle to the display pixel columns. Display areas of the display pixels have edges that are substantially parallel to the lenticular element axes so that pixels of different views are prevented to be projected to the same viewing zone, thereby preventing crosstalk between views and reducing light intensity variations (due to varying amount of the opaque black mask which is imaged. The light intensity output also varies across each pixel display area in a direction perpendicular to the lenticular element axes.

14 Claims, 3 Drawing Sheets

FOREIGN PATENT DOCUMENTS

| | | | |
|---|---|---|---|
| JP | 08327945 A | 12/1996 |
| JP | 09096777 A | 4/1997 |
| JP | 2004157411 A | 4/1997 |
| JP | 2004191570 A | 7/2004 |
| JP | 2004264762 A | 9/2004 |
| JP | 2004271617 A | 9/2004 |
| JP | 2005176004 A | 6/2005 |
| WO | WO2005029873 A1 | 3/2005 |
| WO | WO2005034034 A2 | 4/2005 |
| WO | WO2005093494 A1 | 10/2005 |

DISPLAY DEVICE

This invention relates to an autostereoscopic display device comprising a display panel having an array of display pixels for producing a display, and a plurality of lenticular elements arranged over the display panel and through which the display pixels are viewed.

A known autostereoscopic display device is described in GB 2196166 A. This known device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of four or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

The above described device provides an effective three dimensional display. However, it will be appreciated that, in order to provide stereoscopic views, there is a necessary sacrifice in the horizontal resolution of the device. For example, a display panel having an array of 600 rows and 800 columns of display pixels may provide a four-view autostereoscopic display in which each view comprises an array of 600 rows and 200 pixels. This substantial difference between vertical and horizontal resolution is undesirable.

U.S. Pat. No. 6,064,424 discloses an autostereoscopic display device similar to that described above, except that the elongate lenticular elements are slanted at an angle to the column direction of the display panel. By slanting the lenticular elements, some of the reduction in horizontal resolution, which would otherwise be required, is transferred to the vertical resolution. It thus becomes possible to "consume" both vertical and horizontal resolution to increase the number views displayed by the device.

The device disclosed in the above mentioned US patent overcomes the problem associated with a reduction in horizontal resolution. However, by slanting the lenticular elements at an angle to the columns of display pixels, other problems are introduced. In particular, as a user's head is moved from left to right, variations in light intensity are observed. These intensity variations are caused by the lenticular elements imaging varying amounts of the opaque black mask that defines the pixel areas of the display panel. The variations are observed by the user as moiré interference.

The problem of light intensity variations may be addressed by altering the focal axes of the lenticular elements, so that broader bands of the display panel are imaged. However, cross talk between the different views is then introduced, which is also undesirable.

According to the invention, there is provided an autostereoscopic display device comprising: a display panel having an array of display pixels for producing a display, the display pixels being arranged in rows and columns; and an array of parallel lenticular elements positioned over the display panel, the lenticular elements having optical focal axes that are slanted at an angle to the display pixel columns, wherein display areas of the display pixels have edges that are substantially parallel to the lenticular element axes.

By providing a device having pixel display areas with edges that are parallel to the lenticular element axes, the problems of light intensity variations and cross talk between views are reduced or eliminated. The lenticular element axes, however, remain slanted at an angle to the display pixel columns, and so it is still possible to "consume" both vertical and horizontal resolution to increase the number views displayed by the device.

The display panel may comprise a first mask arrangement for providing pixel display areas having edges that are substantially parallel to the display pixel columns. Such display panels are entirely conventional, and the invention may therefore be based on mass produced units. The autostereoscopic display device then also comprises a second mask arrangement, positioned over the first mask arrangement, and arranged to modify the pixel display areas to have edges that are substantially parallel to the lenticular element axes.

Alternatively, the display panel may comprise a mask arrangement arranged to provide pixel display areas having edges that are substantially parallel to the lenticular element axes. Such display panels are not conventional, and specially designed pixel layouts may therefore be required. Such non-conventional display panels do, however, allow for a larger pixel display area for a given pixel pitch. These pixel display areas may have a rectangular shape.

The mask arrangement may be integrated into the red, green and blue filters of a colour display panel.

Each lenticular element may overlie a plurality of display pixels in the row direction and/or the column direction. There may be a single row of lenticular elements overlying the display panel.

The ratio between the pitch of the pixel display areas and the width of the pixel display areas, in a direction perpendicular to the lenticular element axes, may be greater than or equal to 2:1.

The width of the pixel display areas may be equal to the width of a gap (for example, provided by a mask) between the pixel display areas, in a direction perpendicular to the lenticular element axes.

The rows and columns of display pixels may be orthogonal. A display pixel may be provided at every intersection of the display pixel rows and columns.

The display panel may be a liquid crystal display panel. Such display panels are particularly suitable for use in autostereoscopic display devices.

The light intensity output across each pixel display area may vary in a direction perpendicular to the lenticular element axes, preferably across edge portions of the pixel display area. In particular, the light intensity output of each display pixel may be greater at the centre of the pixel display area than it is at the edges of the pixel display area. This may be achieved by adapting the mask arrangements so that the light transmitting portions that define the pixel display areas have a light attenuating function. In this way, the transition between adjacent views may be smoother, further reducing light intensity variations.

Embodiments of the invention will now be described, purely by way of example, with reference to the accompanying drawings, in which.

The invention provides an autostereoscopic display device in which the lenticular element axes and the edges of the pixel display areas are both slanted at a common angle to the display pixel columns. By providing pixel display areas with edges that are parallel to the lenticular element axes, light intensity variations and cross talk between views can be reduced or eliminated.

Figure 1:
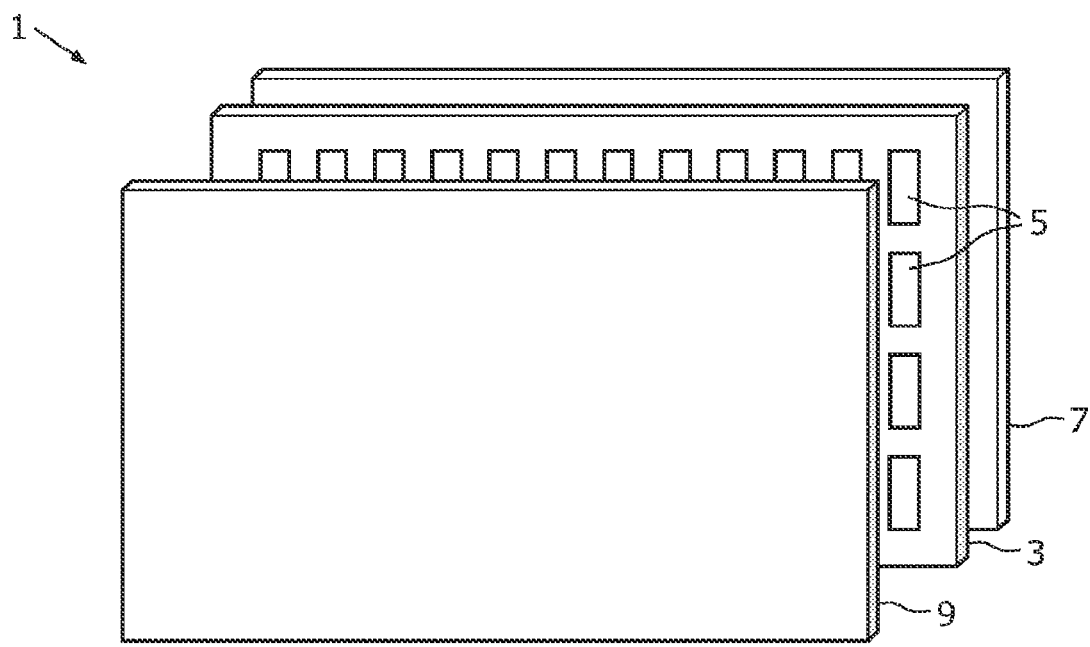
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9 arranged over the display side of the display panel 3. The lenticular sheet 9 comprises a row of lenticular elements extending parallel to one another.

Figure 2:
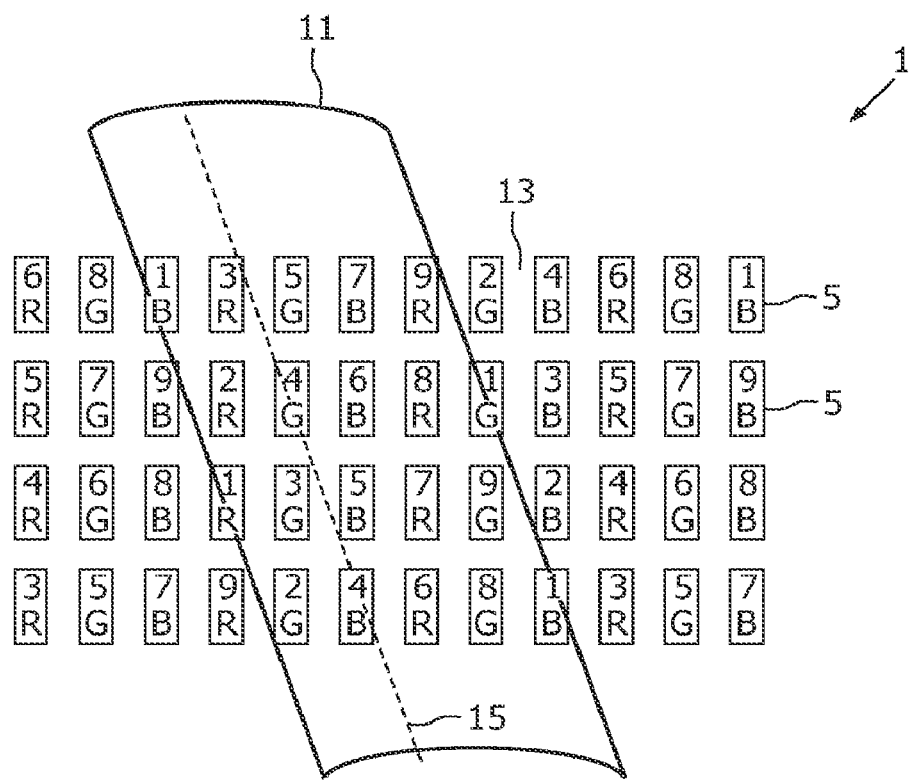
FIG. 2 is a schematic plan view of the display device shown in FIG. 1.

The arrangement of the display pixels 5 and lenticular elements 11 are shown more clearly in FIG. 2, which is a schematic plan view of the display device 1 shown in FIG. 1. Again, only a small number of the display pixels 5a are shown for the sake of clarity.

As can be seen from FIG. 2, the lenticular elements 11, of which only one is shown, are slanted at an angle to the column direction of the display pixels 5, i.e. their longitudinal axis defines an acute angle with the column direction of the display pixels 5.

The lenticular elements 11 are in the form of convex cylindrical lenses, and they act as an optical director means to provide different images, or views, from the display panel 3 to the eyes of a user positioned in front of the display device 1. The lenticular elements 11 also provide a number of different images, or views, to the eyes of the user as the user's head moves from left to right in front of the display device 1.

The autostereoscopic display device 1 shown in FIGS. 1 and 2 is capable of providing nine different views. In particular, for each group of eighteen display pixels 5 overlaid by a lenticular element 11, the lenticular element 11 projects two pixels 5 in each of nine different directions, so as to form the nine different views. The display pixels 5 in FIG. 2 are labelled from "1" to "9" to indicate to which of the views they correspond.

As well as the display pixels 5, the lenticular element 11 also projects portions of the black mask 13 provided between the display pixels 5.

For example, the lenticular element 11 shown in FIG. 2 overlies a group of eighteen display pixels 5. The dashed line 15 indicates a portion of the display panel 3 that is projected by the lenticular element 11 in one particular direction to produce one of the nine different views. As can be seen, two display pixels for view "4" are projected, as is a significant amount of the black mask 13. Small amounts of display pixels for the neighbouring views "3" and "5" are also projected, and this is observed as cross talk between the views.

It will be appreciated that, as the user's head moves from left to right, his/her eyes will receive several different ones of the nine views, in turn. As the user's head moves in this way, the proportion of the black mask 13 received by the user's eyes also varies, thereby causing light intensity variations. These undesirable light intensity variations are observed as a moiré pattern.

Figure 3:
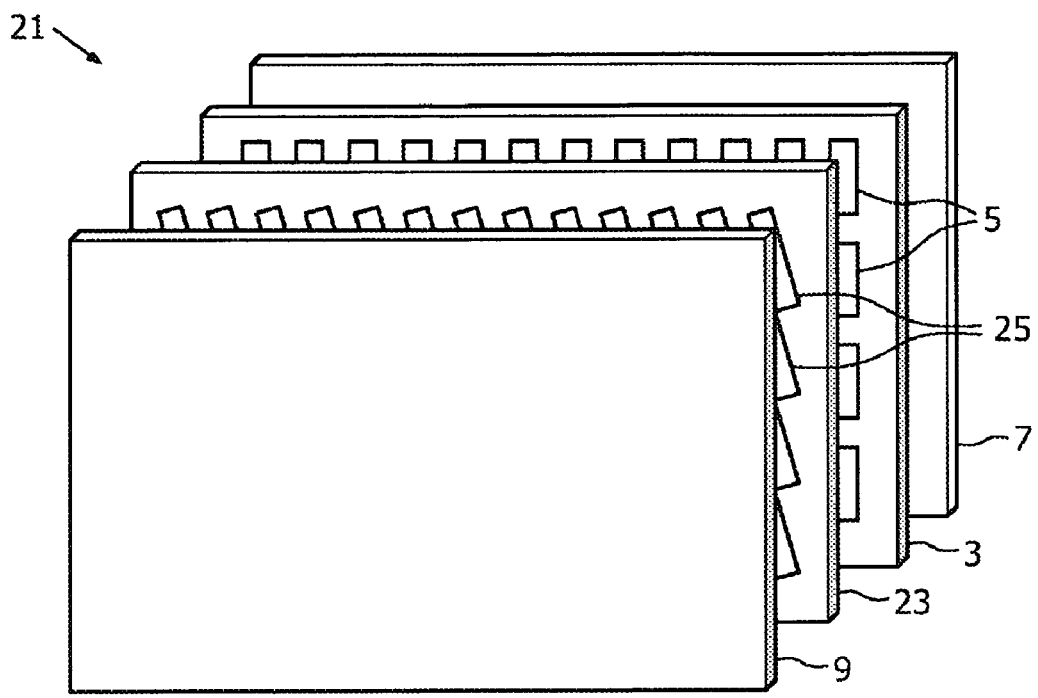
FIG. 3 is a schematic perspective view of a first embodiment of the invention.
Figure 4:
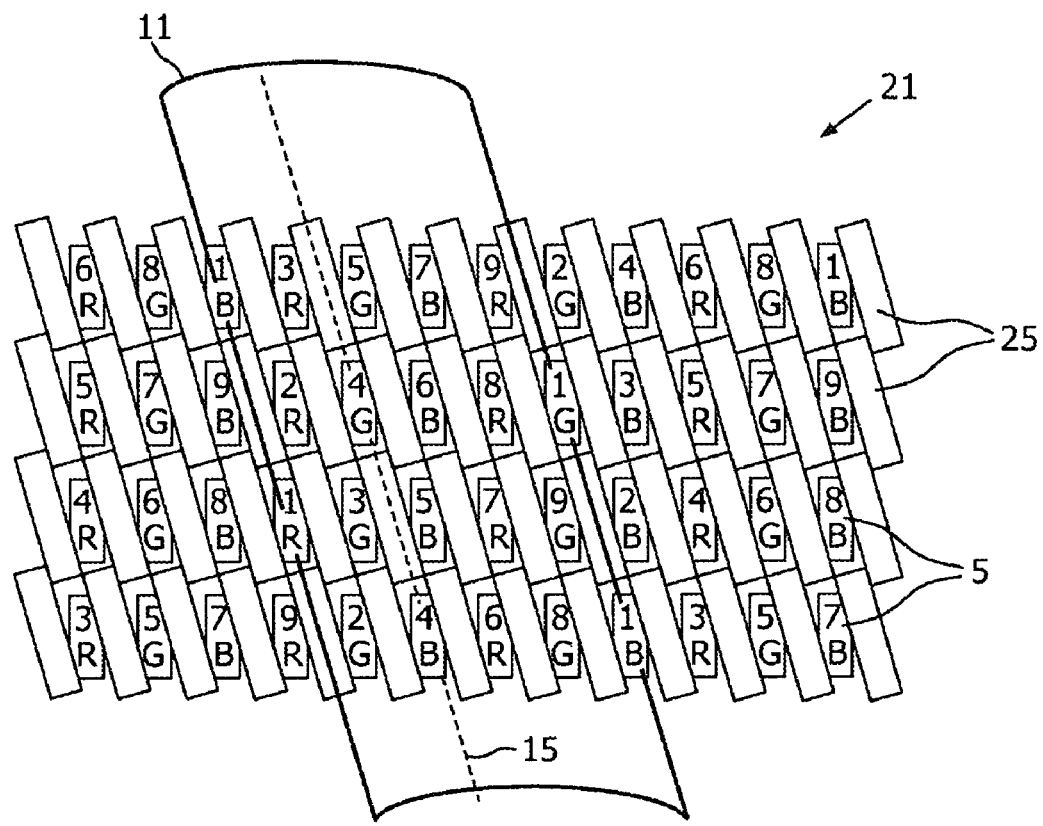
FIG. 4 is a schematic plan view of the display device shown in FIG. 3.

The problems associated with the known autostereoscopic display device 1 described above are addressed by autostereoscopic display devices according to the invention. FIGS. 3 and 4 show schematic perspective and plan views respectively of a first autostereoscopic display device 21 according to the invention.

The display device 21 shown in FIGS. 3 and 4 is similar in many ways to the device shown in FIGS. 1 and 2, and like numerals indicate like features. In particular, the display device 21 comprises a display panel 3, a light source 7 and a lenticular sheet 9 that are identical to those described above with reference to FIG. 1. Referring to FIG. 4, it can be seen that the lenticular sheet 9 comprises a row of slanted lenticular elements 11, although for the sake of clarity only one element 11 is shown.

The display device 21 shown in FIGS. 3 and 4 additionally comprises a mask arrangement 23 positioned between the display panel 3 and the lenticular sheet 9. This mask arrangement 23 is in addition to the mask arrangement that is provided as part of the display panel 3 and that defines the normally rectangular pixels of the display panel 3.

The function of the additional mask arrangement 23 is to modify the shape of the rectangular pixels 5 of the display panel 3 to provide specifically shaped pixel display areas.

Referring to FIG. 4, it can be seen that the additional mask arrangement 23 comprises an array of slanted, rectangular opaque areas 25. The opaque areas 25 are slanted at an angle so that their longer sides are parallel to the optical focal axes of the lenticular elements 11. The opaque areas 25 are positioned so as to cover the areas between the display pixels 5 of the display panel 3. However, because the opaque areas 25 are slanted, they also cover parts of the adjacent display pixels 5 themselves, thereby providing the modified pixel display areas.

The opaque areas 25 of the additional mask arrangement 23 may be provided on a carrier sheet, in the form of a black, light absorbing material similar to that used in the mask arrangement of the display panel 3.

The effect of the additional mask arrangement 23 is therefore that the pixel display areas of the device 21 are modified so that portions of their edges are parallel to the lenticular element axes, as shown in FIG. 4.

In common with the device 1 described with reference to FIGS. 1 and 2, the device 21 shown in FIGS. 3 and 4 is capable of providing nine different views. In particular, for each group of eighteen display pixels 5 overlaid by a lenticular element 11, the lenticular element 11 projects two pixels 5 in each of nine different directions, so as to form the nine different views. The display pixels 5 in FIG. 4 are labelled from "1" to "9" to indicate to which of the views they correspond.

As well as the display pixels 5, the lenticular element 11 also projects portions of the black mask 13 provided between the display pixels 5. For example, the lenticular element 11 shown in FIG. 4 overlies a group of eighteen display pixels 5. The dashed line 15 indicates a portion of the display panel 3 that is projected by the lenticular element 11 in one particular direction to produce one of the nine different views.

As can be seen, two display pixels for view "4" are projected, as is a significant amount of the black mask 13. However, because the pixel display areas have been modified by the additional mask arrangement 23, no portions of display pixels for the neighbouring views "3" and "5" are projected. Accordingly, undesirable cross talk between the different views is prevented.

The modification of the pixel display areas also causes undesirable light intensity variations, which are otherwise observed as the viewing angle changes, to be reduced. In particular, the relative amounts of display pixel and black mask received by the user's eyes, as his/her head moves from left to right, vary to a lesser degree.

Figure 5:
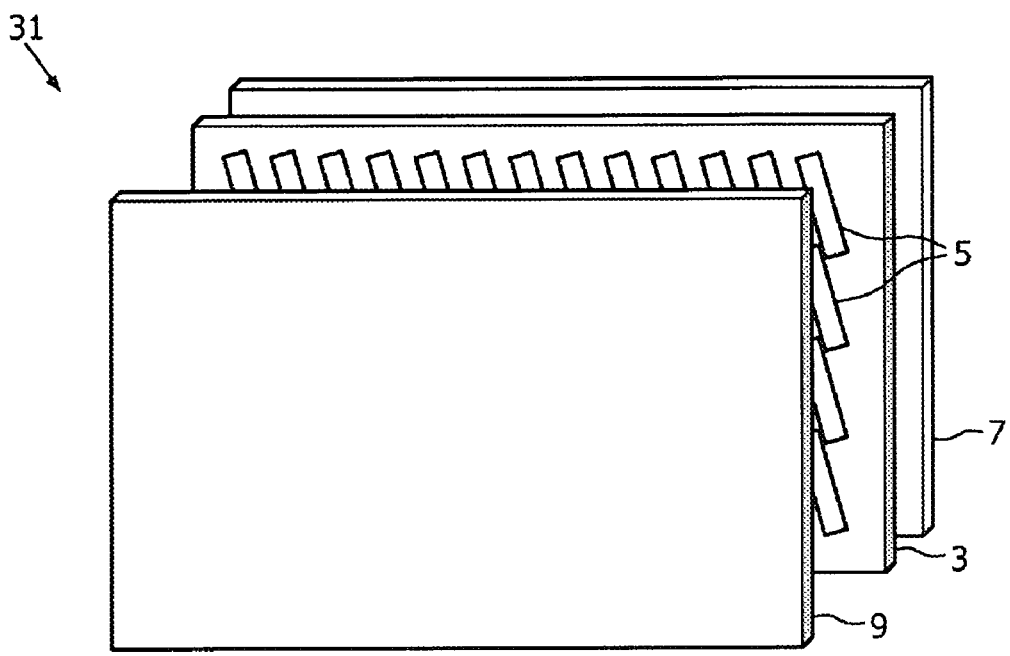
FIG. 5 is a schematic perspective view of a second embodiment of the invention.
Figure 6:
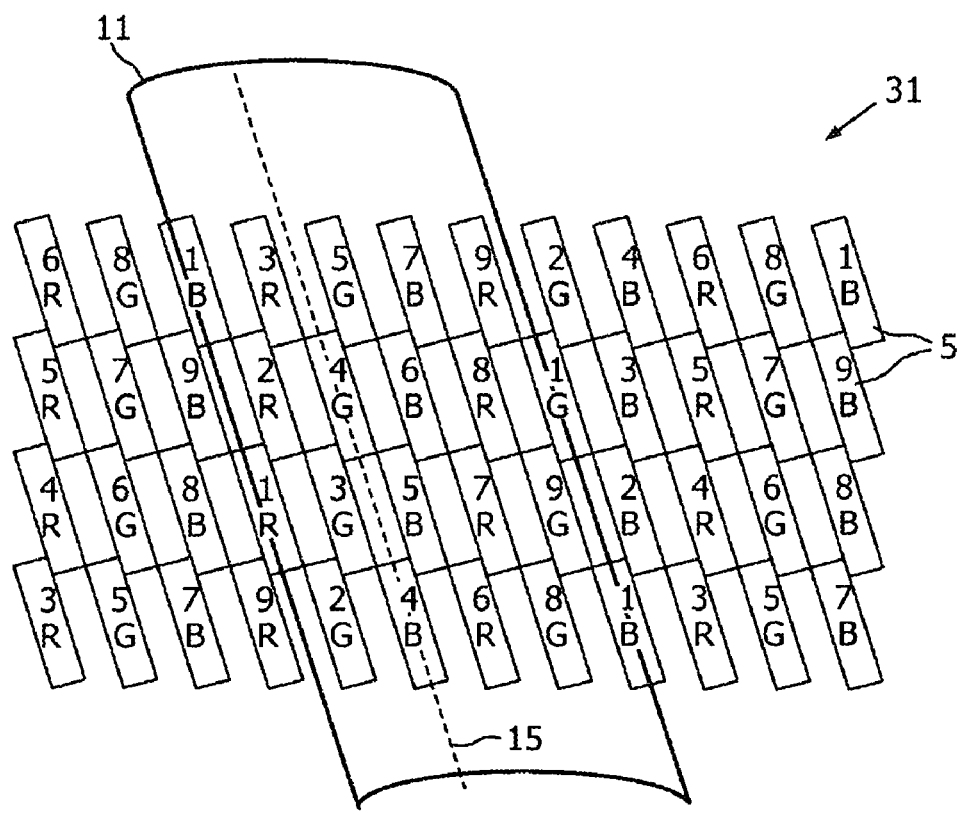
FIG. 6 is a schematic plan view of the display device shown in FIG. 5.

FIGS. 5 and 6 show schematic perspective and plan views respectively of a second autostereoscopic display device 31 according to the invention.

The display device 31 shown in FIGS. 5 and 6 is similar to the device shown in FIGS. 1 and 2, and like numerals indicate like features. In particular, the display device 31 comprises a light source 7 and a lenticular sheet 9 that are identical to those described above with reference to FIGS. 1 and 2. Referring to FIG. 6, it can be seen that the lenticular sheet 9 comprises a row of slanted lenticular elements, although for the sake of clarity only one element 11 is shown.

The display device 31 shown in FIGS. 5 and 6 also comprises a display panel 3 positioned between the light source 7 and the lenticular sheet 9. The display panel 3 is identical to that described with reference to FIGS. 1 and 2, except that the rectangular display pixels 5 are slanted at an angle to the display pixel columns. In particular, the display pixels 5 are slanted so that the longer edges of the display pixels 5 are parallel with the lenticular element axes.

Thus, whereas the device 21 shown in FIGS. 3 and 4 employed an additional mask arrangement 23 to modify the conventional pixel display areas of the display panel, the device 31 shown in FIGS. 5 and 6 employs a non-convention display panel 3 already having slanted display pixels 5.

The slanted shape of the display pixels 5 in the device 31 shown in FIGS. 5 and 6 is defined by the mask arrangement within the display panel 3 itself. However, the entire structure of the display pixels 5, including the electrode patterns and liquid crystal material, may be modified, so as to provide a device 31 that has larger pixel display areas than those of the device 21 shown in FIGS. 3 and 4. In this way, brightness of the display device 31 is be increased.

Operation of the device shown in FIGS. 5 and 6 is exactly the same as operation of the device shown in FIGS. 3 and 4, and for this reason a detailed description will be omitted. It is sufficient to note that the effect of the modified mask arrangement of the display panel 3 is the same as that of the additional mask arrangement 23 shown in FIGS. 3 and 4, i.e. the edges of the pixel display areas are provided parallel to the lenticular element axes, and this effectively prevents cross talk between the different views. Light intensity variations, as the user's head moves from left to right, are also reduced. In fact, because the slanted pixel display areas are rectangular in shape, a constant amount of the pixel display areas is projected by the lenticular elements 11. The light intensity thus remains almost constant as the user's head moves from left to right.

Specific examples of the invention have been described. However, it will be apparent to those skilled in the art that various changes and modifications may be made to these embodiments, without departing from the scope of the invention.

For example, arrangements in which nine views are provided have been described. However, it will be apparent to those skilled in the art that a different number of views may be provided by an arrangement having wider and/or longer lenticular elements. The same number of views could also be provided by arrangements having different lenticular element configurations.

The specific examples described above employ liquid crystal display panels having, for example, a display pixel pitch in the range 50 μm to 1000 μm. However, it will be apparent to those skilled in the art that alternative types of display panel may be employed, such as organic light emitting diode (OLED) or cathode ray tube (CRT) display devices.

In the second example described above, the entire structure of the pixels of the display panel is modified to provide slanted pixel display areas. However, in other embodiments, the modifications could be limited to the mask arrangement of the display panel. In certain colour display device embodiments, the mask arrangement of the display panel could be integrated with the colour filters of the display pixels.

In the embodiments described above, there is a relatively sudden transition between the various views, as the viewing angle changes. Accurate positioning of the pixel display areas is therefore required in order to avoid momentary, but large, light intensity variations during the transition between views. The additional mask arrangement and/or the mask arrangement of the display panel may, however, be modified so that the light transmitting portions that define the pixel display areas have a light attenuating function. In particular, the light output of the display pixels can be arranged to fade gradually towards the edges of the pixel display areas, so as to smooth the transition between the views.

Throughout this disclosure the term "pixel" has been used. This term is intended to refer to independently switchable display elements, and therefore includes sub-pixels in a colour display.

The invention claimed is:

1. An autostereoscopic display device comprising:
   a display panel having an array of display pixels for producing a display, the display pixels being arranged in rows and columns; and
   an array of parallel lenticular elements positioned over the display panel, the lenticular elements having optical focal axes that are slanted at an angle to the display pixel columns, wherein the display pixels of the display panel have a shape such that display areas of the display pixels have edges that are substantially parallel to the lenticular element axes.

2. An autostereoscopic display device according to claim 1, wherein the display panel comprises a first mask arrangement for providing pixel display areas having edges that are substantially parallel to the display pixel columns, and wherein the autostereoscopic display device further comprises a second mask arrangement, positioned over the first mask arrangement, arranged to modify the pixel display areas to have edges that are substantially parallel to the lenticular element axes.

3. An autostereoscopic display device according to claim 1, wherein the display panel comprises a mask arrangement arranged to provide pixel display areas having edges that are substantially parallel to the lenticular element axes.

4. An autostereoscopic display device according to claim 3, wherein the pixel display areas have a rectangular shape.

5. An autostereoscopic display device according to claim 3, wherein the mask arrangement comprises colour filters.

6. An autostereoscopic display device according to claim 1, wherein each lenticular element overlies a plurality of display pixels in the row direction.

7. An autostereoscopic display device according to claim 1, wherein each lenticular element overlies a plurality of display pixels in the column direction.

8. An autostereoscopic display device according to claim 1, wherein the ratio between the pitch of the pixel display areas and the width of the pixel display areas, in a direction perpendicular to the lenticular element axes, is greater than or equal to 2:1.

9. An autostereoscopic display device according to claim 1, wherein the width of the pixel display areas is equal to the width of a gap between the pixel display areas, in a direction perpendicular to the lenticular element axes.

10. An autostereoscopic display device according to claim 1, wherein the rows and columns of display pixels are orthogonal.

11. An autostereoscopic display device according to claim 1, wherein a display pixel is provided at every intersection of the display pixel rows and columns.

12. An autostereoscopic display device according to claim 1, wherein the display panel is a liquid crystal display panel.

13. An autostereoscopic display device according to claim 1, wherein the light intensity output across each pixel display area varies in a direction perpendicular to the lenticular element axes.

14. An autostereoscopic display device according to claim 13, wherein the light intensity output of each display pixel is greater at the centre of the pixel display area than at the edges of the pixel display area.

* * * * *